US011870184B2

(12) United States Patent
Okubo

(10) Patent No.: US 11,870,184 B2
(45) Date of Patent: Jan. 9, 2024

(54) MULTIPOLAR CONNECTOR SET

(71) Applicant: Murata Manufacturing Co., Ltd., Kyoto-fu (JP)

(72) Inventor: Daisuke Okubo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 208 days.

(21) Appl. No.: 17/461,361

(22) Filed: Aug. 30, 2021

(65) Prior Publication Data

US 2021/0391669 A1 Dec. 16, 2021

Related U.S. Application Data

(63) Continuation of application No. PCT/JP2020/013489, filed on Mar. 25, 2020.

(30) Foreign Application Priority Data

Mar. 29, 2019 (JP) ................................ 2019-065181

(51) Int. Cl.
*H01R 12/79* (2011.01)
*H01R 13/641* (2006.01)
(Continued)

(52) U.S. Cl.
CPC ......... *H01R 13/641* (2013.01); *H01R 12/716* (2013.01); *H01R 13/6582* (2013.01); *H01R 13/6597* (2013.01)

(58) Field of Classification Search
CPC ........................... H01R 13/641; H01R 12/716; H01R 13/6582; H01R 13/6597; H01R 13/20;
(Continued)

(56) References Cited

U.S. PATENT DOCUMENTS

2007/0173116 A1* 7/2007 Nagata ................. H01R 12/716 439/587
2010/0190383 A1* 7/2010 Yamada ............... H01R 13/641 439/680

(Continued)

FOREIGN PATENT DOCUMENTS

JP H10-214659 A 8/1998
JP 2016-184505 A 10/2016
WO 2019/021611 A1 1/2019

OTHER PUBLICATIONS

International Search Report issued in PCT/JP2020/013489; dated May 26, 2020.

(Continued)

*Primary Examiner* — Abdullah A Riyami
*Assistant Examiner* — Nelson R. Burgos-Guntin
(74) *Attorney, Agent, or Firm* — Studebaker & Brackett PC

(57) ABSTRACT

A multipolar connector includes first and second connectors. The first connector includes first internal terminals, first external terminals connected to a ground potential, and a first insulating member that holds the first internal terminals and the first external terminals. The second connector includes second internal terminals, second external terminals connected to the ground potential, and a second insulating member that holds the second internal terminals and the second external terminals. In a state in which the first connector and the second connector fit together, the first internal terminals are connected to the second internal terminals, and each of the first external terminals is connected to the corresponding one of the second external terminals in such a manner that connection portions defined by the first external terminal and the second external termi- (Continued)

nal are visible from the corresponding one of sides on which end surfaces of the first connector are located.

19 Claims, 9 Drawing Sheets

(51) Int. Cl.
*H01R 12/71* (2011.01)
*H01R 13/6582* (2011.01)
*H01R 13/6597* (2011.01)

(58) Field of Classification Search
CPC ... H01R 13/631; H01R 13/6594; H01R 12/73
See application file for complete search history.

(56) References Cited

U.S. PATENT DOCUMENTS

| | | | | |
|---|---|---|---|---|
| 2016/0141783 | A1* | 5/2016 | Hirakawa | H01R 12/73<br>439/66 |
| 2016/0294094 | A1* | 10/2016 | Nakamura | H01R 13/18 |
| 2018/0054013 | A1* | 2/2018 | Osaki | H01R 12/71 |
| 2018/0205165 | A1* | 7/2018 | Hoshiba | H01R 12/716 |

OTHER PUBLICATIONS

Written Opinion of the International Searching Authority issued in PCT/JP2020/013489; dated May 26, 2020.

* cited by examiner

MULTIPOLAR CONNECTOR SET

CROSS-REFERENCE TO RELATED APPLICATIONS

This application claims benefit of priority to International Patent Application No. PCT/JP2020/013489, filed Mar. 25, 2020, and to Japanese Patent Application No. 2019-065181, filed Mar. 29, 2019, the entire contents of each are incorporated herein by reference.

BACKGROUND

Technical Field

The present disclosure relates to a multipolar connector set including a first connector and a second connector that fit together.

Background Art

A multipolar connector set for forming an electrical connection between two circuit boards is known, as described, for example, in International Publication No. 2019/021611. The multipolar connector set includes a first connector for connection to one of the two circuit boards and a second connector for connection to the other circuit board, and the first and second connectors fit together.

The first connector of the multipolar connector set disclosed in International Publication No. 2019/021611 includes a first internal terminal, a first insulating member, and first external terminals. The first internal terminal includes terminals aligned in a longitudinal direction. The first insulating member supports the first internal terminal. Each of the first external terminals is at the corresponding one of two ends of the first internal terminal in the longitudinal direction and is connected to a ground potential. The second connector of the multipolar connector set disclosed in International Publication No. 2019/021611 includes a second internal terminal, a second insulating member, and second external terminals. The second internal terminal includes terminals aligned in the longitudinal direction. The second insulating member supports the second internal terminal. Each of the second external terminals is at the corresponding one of two ends of the second internal terminal in the longitudinal direction and is connected to the ground potential. In a state in which the first and second connectors fit together, the first internal terminal is connected to the second internal terminal, and the first external terminals are connected to the second external terminals.

SUMMARY

Such a multipolar connector set is increasingly adopted into transmission of signals of higher frequencies. The multipolar connector set configured to transmit radio-frequency signals involves radiation of electromagnetic fields from the internal terminals that transmit radio-frequency signals. Consequently, resonance is likely to occur in the external terminals adjacent to the internal terminals and in ground conductor patterns of circuit boards fitted with the multipolar connector set. The undesired resonance causes radiation noise, which could be a hindrance to stable signal transmission in the transmission band concerned.

In order for the multipolar connector set to eliminate or reduce the occurrence of undesired resonance, it is important that a proper connection be established between each of the first external terminals of the first connector and the corresponding one of the second external terminals of the second connector.

In a state in which the first and second connectors fit together, the inner space of the multipolar connector set disclosed in International Publication No. 2019/021611 is enclosed with side surfaces and end surfaces. It is thus not easy to check from the outside whether each of the first external terminals is properly connected to the corresponding one of the second external terminals.

The present disclosure provides a multipolar connector set in which a first external terminal and a second external terminal are included in such a manner that it is easy to check from the outside whether the first external terminal is properly connected to the second external terminal.

To that end, a multipolar connector set according to an aspect of the present disclosure includes a first connector and a second connector that fit together. A longitudinal direction, a width direction, and a height direction of each of the first connector, the second connector, and the multipolar connector set are orthogonal to one another in a state in which the first connector and the second connector fit together. The first connector and the second connector each have two end surfaces on opposite sides in the longitudinal direction, two side surfaces on opposite sides in the width direction, and two principal surfaces on opposite sides in the height direction. The first connector includes a first internal terminal, a first external terminal connected to a ground potential, and a first insulating member that holds the first internal terminal and the first external terminal. The second connector includes a second internal terminal, a second external terminal connected to the ground potential, and a second insulating member that holds the second internal terminal and the second external terminal. In the state in which the first connector and the second connector fit together, the first internal terminal is connected to the second internal terminal, and the first external terminal is connected to the second external terminal in such a manner that connection portions defined by the first and second external terminals are visible from an end surface side of the first connector.

The multipolar connector set according to the present disclosure is advantageous in that the connection portions defined by the first and second external terminals are visible from an end surface side of the first connector. It is therefore easy to check from the outside whether the first external terminal is properly connected to the second external terminal.

DETAILED DESCRIPTION

Figure 1A:
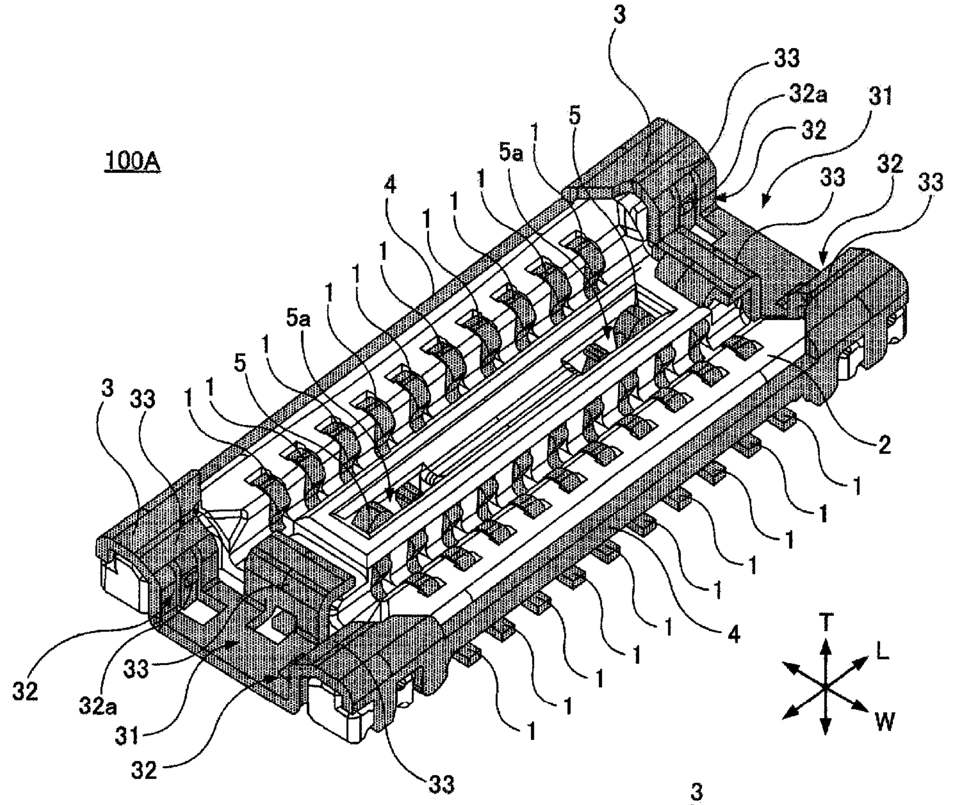
FIG. 1A is a perspective view of a first connector, illustrating a state in which the first connector is viewed from a side on which a fitting surface is located.

Hereinafter, embodiments of the present disclosure will be described with reference to the accompanying drawings.

The following embodiments of the present disclosure are merely illustrative and should not be construed as limiting the scope of the present disclosure. It should also be noted that features in different embodiments may be combined, and these combinations are embraced by the present disclosure. The drawings are provided to facilitate the understanding of the embodiments and may include schematic illustrations. For example, the dimension ratios of constituent components illustrated in the drawings or the relative dimension ratios of the constituent components may be inconsistent with the corresponding dimension ratios noted in the description. In one or more of the drawings, there may be omissions of constituent components mentioned in the description, or there may be omissions of one or more of identical constituent components.

First Embodiment

Figure 1B:
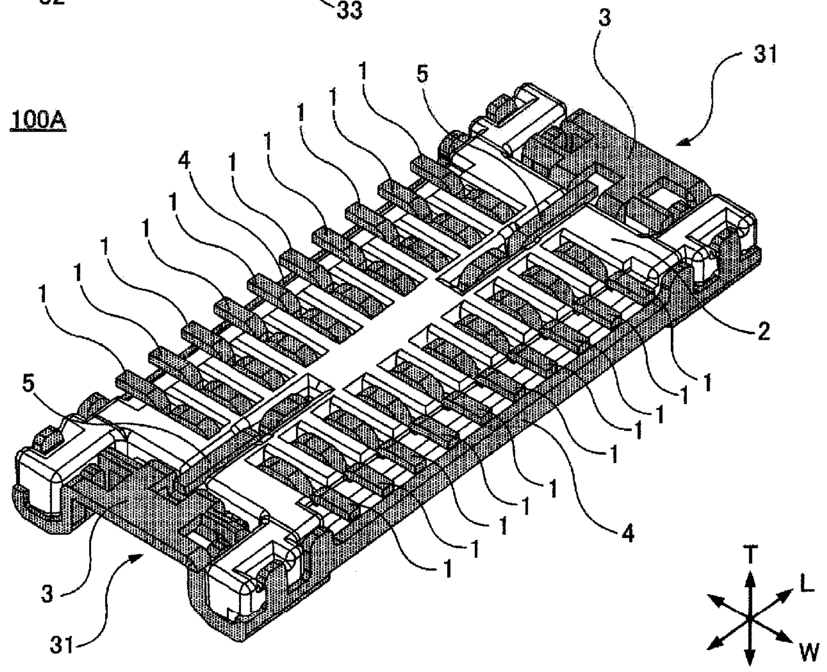
FIG. 1B is a perspective view of the first connector, illustrating a state in which the first connector is viewed from a side on which a mounting surface is located.
Figure 2:
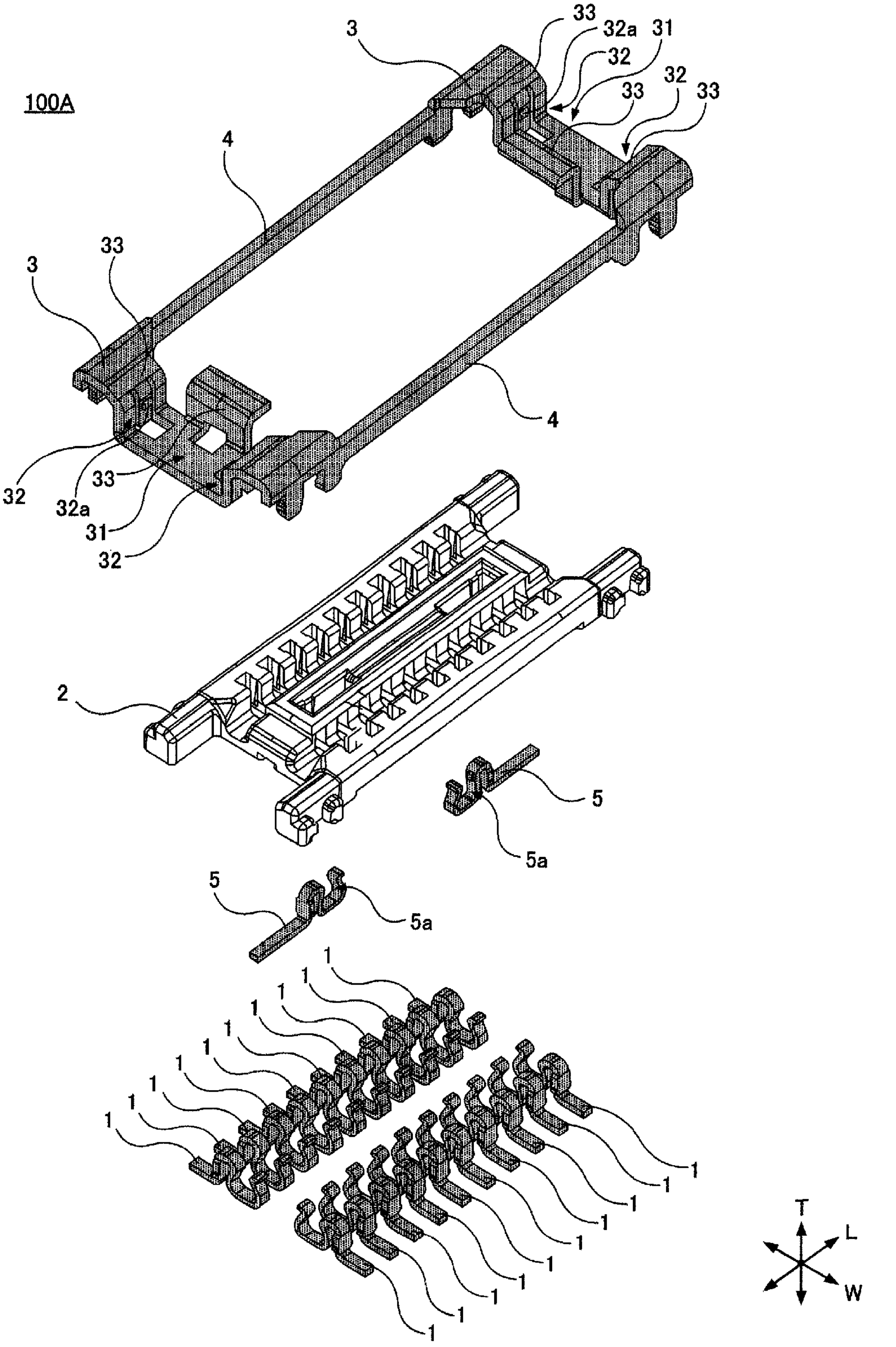
FIG. 2 is an exploded perspective view of the first connector.
Figure 3A:
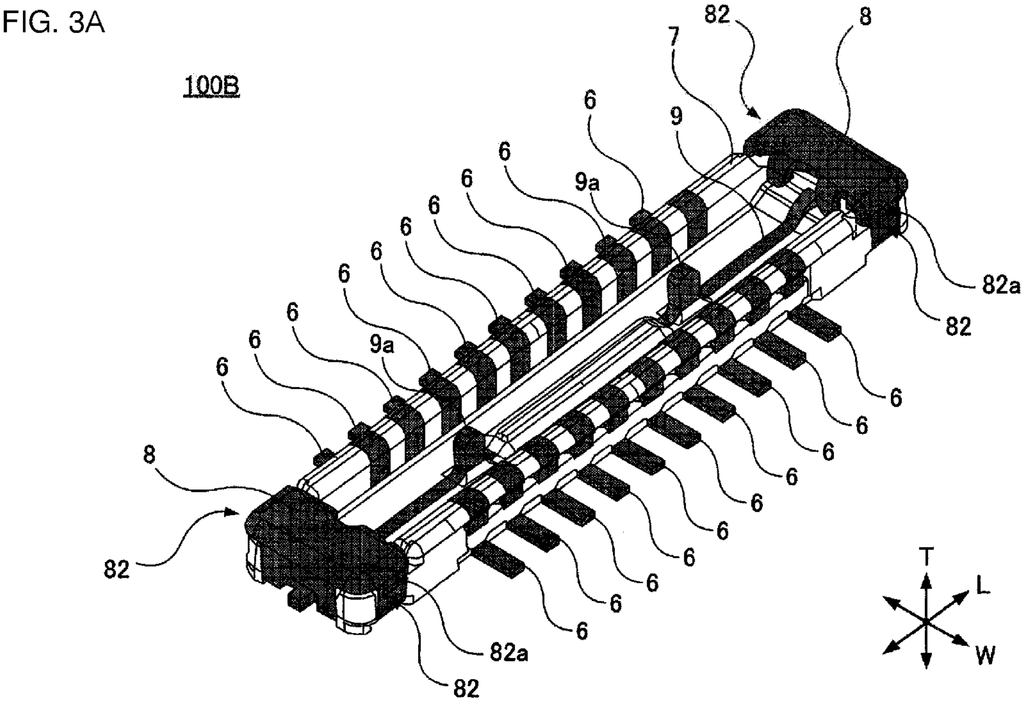
FIG. 3A is a perspective view of a second connector, illustrating a state in which the second connector is viewed from the side on which a fitting surface is located.
Figure 3B:
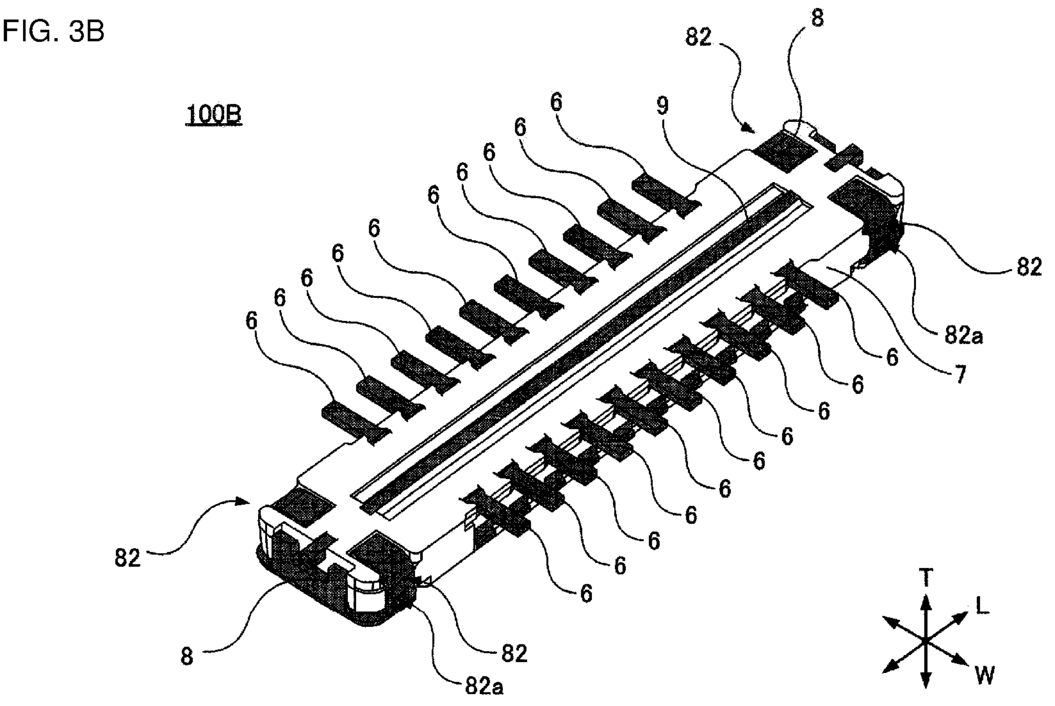
FIG. 3B is a perspective view of the second connector, illustrating a state in which the second connector is viewed from the side on which a mounting surface is located.
Figure 4:
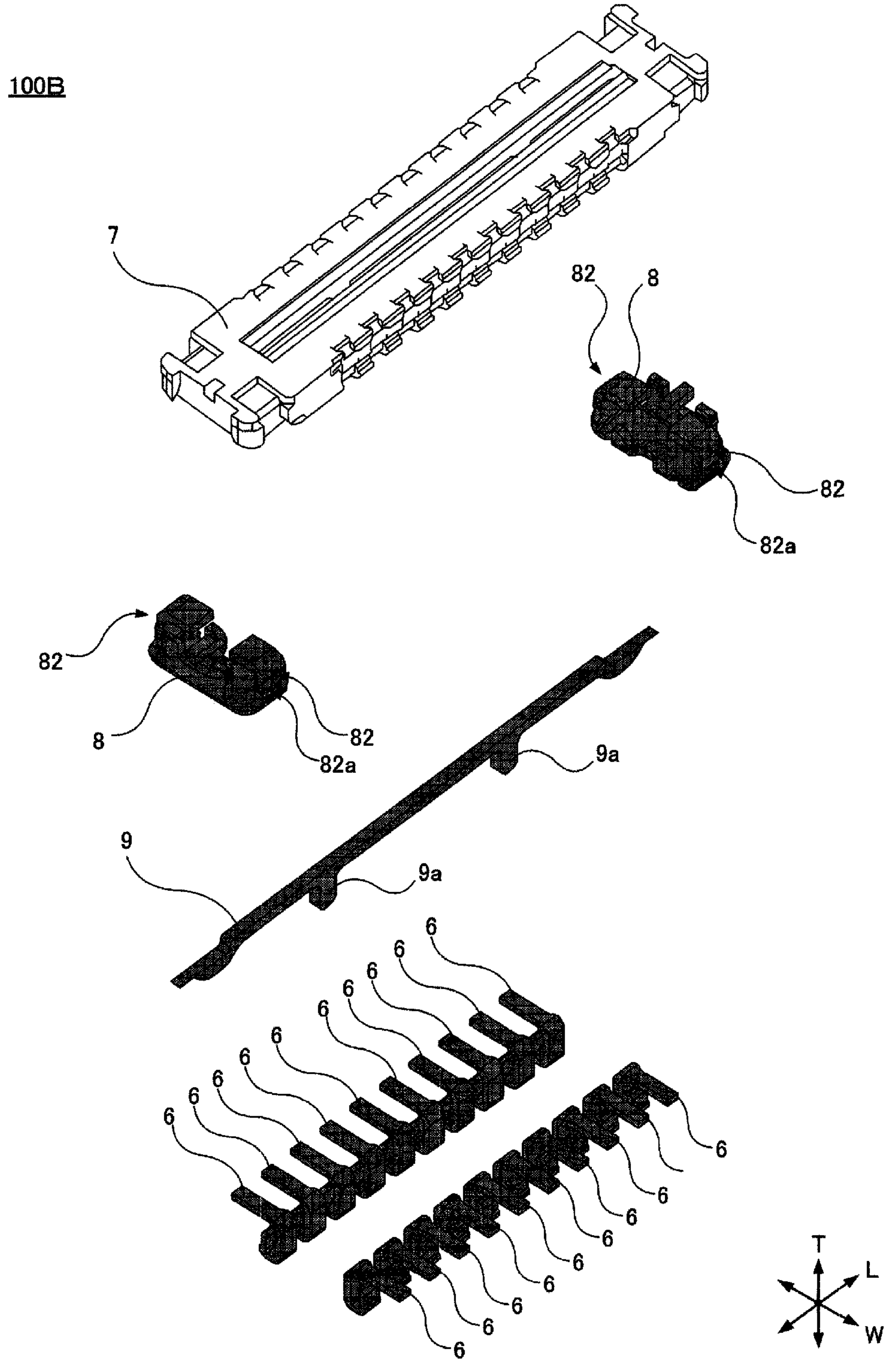
FIG. 4 is an exploded perspective view of the second connector.
Figure 5:
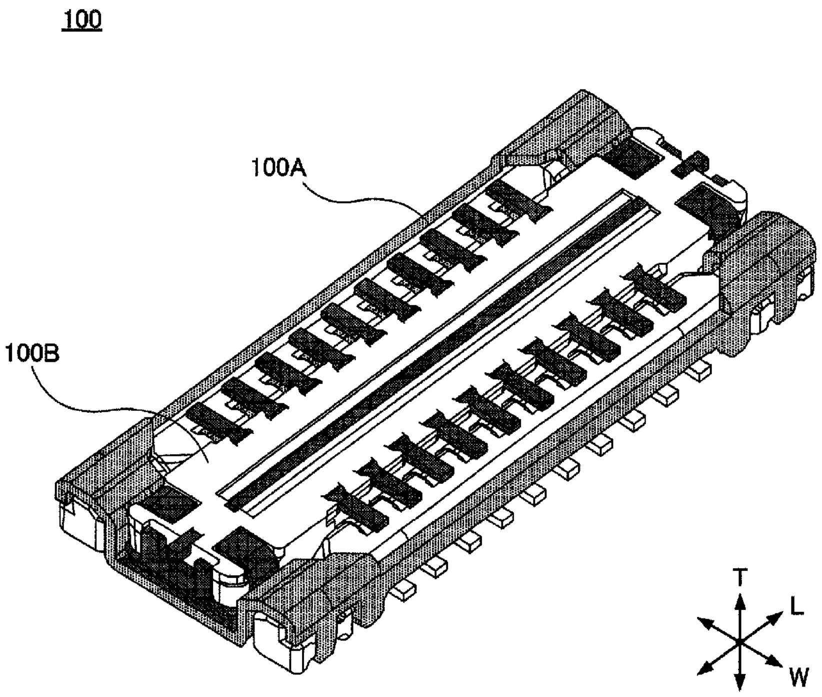
FIG. 5 is a perspective view of a multipolar connector set.
Figure 6:
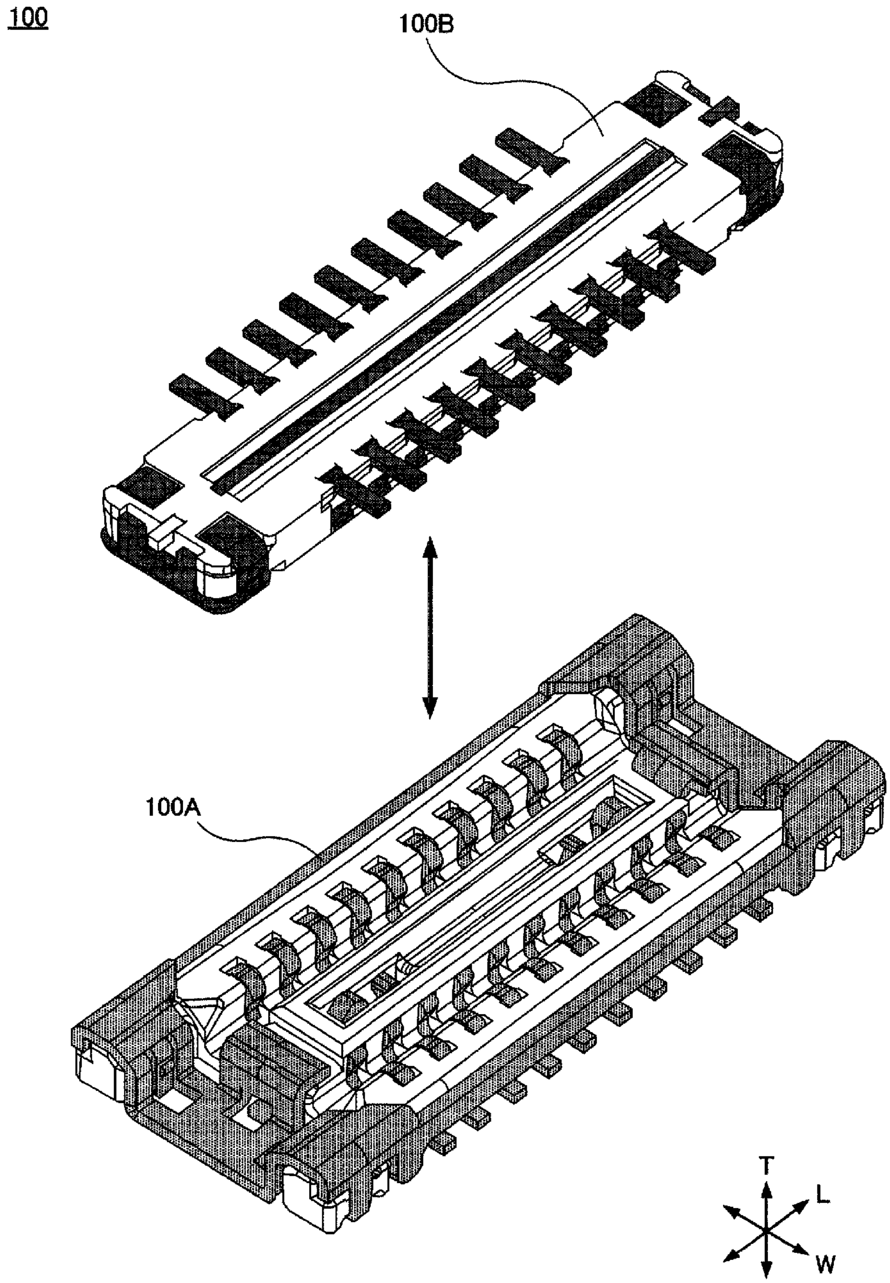
FIG. 6 is a perspective view of the multipolar connector set, illustrating a state in which the first connector and the second connector are delinked from each other.

FIGS. 1A, 1B, 2, 3A, 3B, 4, 5, and 6 illustrate a multipolar connector set 100 according to a first embodiment. The multipolar connector set 100 includes a first connector 100A and a second connector 100B, which fit together. FIG. 1A is a perspective view of the first connector 100A, illustrating a state in which the first connector 100A is viewed from a side on which a fitting surface is located. FIG. 1B is a perspective view of the first connector 100A, illustrating a state in which the first connector 100A is viewed from a side on which a mounting surface is located. FIG. 2 is an exploded perspective view of the first connector 100A. FIG. 3A is a perspective view of the second connector 100B, illustrating a state in which the second connector 100B is viewed from the side on which a fitting surface is located. FIG. 3B is a perspective view of the second connector 100B, illustrating a state in which the second connector 100B is viewed from the side on which a mounting surface is located. FIG. 4 is an exploded perspective view of the second connector 100B. FIG. 5 is a perspective view of the multipolar connector set 100. FIG. 6 is a perspective view of the multipolar connector set 100, illustrating a state in which the first connector 100A and the second connector 100B are delinked from each other. The term "multipolar connector" herein refers to a connector including a plurality of internal terminals.

T, L, and W in the accompanying drawings denote the height direction, the longitudinal direction, and the width direction, respectively, of each of the multipolar connector set 100, the first connector 100A, and the second connector 100B. The same applies to the following description. The multipolar connector set 100, the first connector 100A, and the second connector 100B each include two end surfaces on opposite sides in the longitudinal direction L, two side surfaces on opposite sides in the width direction W, and two principal surfaces (a mounting surface and a fitting surface) on opposite sides in the height direction T.

As mentioned above, the first connector 100A and the second connector 100B fit together to constitute the multipolar connector set 100. The first connector 100A, the second connector 100B, and the multipolar connector set 100 will be described one by one.

First Connector 100A

The first connector 100A is illustrated in FIGS. 1A, 1B, and 2.

The first connector 100A includes first internal terminals 1. The first internal terminals 1 may be connected to signal lines on a circuit board having the first connector 100A mounted thereon or may be connected to the ground established for the circuit board. The first internal terminals 1 in the present embodiment are female terminals. Alternatively, the first internal terminals 1 may be male terminals.

The material of the first internal terminals 1 may be freely selected. For example, the first internal terminals 1 are made of phosphor bronze. Phosphor bronze is electrically conductive and is elastically deformable.

The first internal terminals 1 in the present embodiment are obtained by bending metal strips. Alternatively, the first internal terminals 1 may be stamped out of a springy metal member.

The first connector 100A includes a first insulating member 2. The first insulating member 2 is intended for holding the first internal terminals 1. The material of the first insulating member 2 may be freely selected. For example, the first insulating member 2 may be made of resin. The first internal terminals 1 are insert-molded with the first insulating member 2. Alternatively, the first internal terminals 1 may be pressed into the first insulating member 2 in a manner so as to be fastened in place.

The first internal terminals 1 are aligned in two rows extending in the longitudinal direction L. The first internal terminals 1 are extended from the first insulating member 2 in the width direction W.

The first connector 100A includes first external terminals 3, each of which is located on the corresponding one of two ends of the first insulating member 2. In the present embodiment, the first external terminals 3 on the respective ends are structurally and electrically connected to each other by a pair of side shields 4. Each shield of the pair of side shields 4 is located on the corresponding one of two side surfaces of the first connector 100A. The pair of side shields 4 may be optionally included in the present disclosure.

The first external terminals 3 may be connected to the ground established for the circuit board having the first connector 100A mounted thereon. The first external terminals 3 shield the respective end surfaces of the first connector 100A. Each shield of the pair of side shields 4 shields the corresponding side surface of the first connector 100A.

The material of the first external terminals 3 and the material of the pair of side shields 4 may be freely selected.

For example, the first external terminals 3 and the pair of side shields 4 are made of phosphor bronze.

The first external terminals 3 and the pair of side shields 4 in the present embodiment are constructed as one piece by being stamped out of one metal plate and being bent. Alternatively, the first external terminals 3 and the pair of side shields 4 may be formed separately and may be then bonded together.

The first external terminals 3 and the pair of side shields 4 are insert-molded with the first insulating member 2. Alternatively, the first external terminals 3 and the pair of side shields 4 may be pressed into the first insulating member 2 in a manner so as to be fastened in place.

The first external terminals 3 each have a recessed portion 31. Second external terminals 8, which are included in the second connector 100B and will be described later, are caught in the respective recessed portions 31.

Each of the recessed portions 31 of the respective first external terminals 3 is open on the side on which the corresponding one of the end surfaces of the first connector 100A is located.

The first external terminals 3 each include first connection portions 32, which are located on the respective inner sides of the recessed portion 31 in the width direction W and are provided for connection to the corresponding second external terminal 8. A portion of each of the recessed portions 31 on the inner side in the longitudinal direction L (i.e., on the side opposite the side on which the recessed portion 31 is open) may be used as a connection portion for connection to the corresponding second external terminal 8.

The first connection portions 32 in the present embodiment each have a rock protrusion 32*a*. The first connection portions 32 may each have a rock hole instead of the rock protrusion 32*a*. Although the first connection portions 32 each preferably have a rock protrusion or a rock hole to enhance the fit or to click to indicate a good fit, the first connection portions 32 may each have neither a rock protrusion nor a rock hole, and the second external terminals 8 may be pushed into the recessed portions in a manner so as to be fastened in place.

The first external terminals 3 each include guides 33, which taper and serve the purpose of fitting the second external terminal 8 into the recessed portion 31. More specifically, two guides 33 are located on the respective inner sides of the recessed portion 31 in the width direction W, and one guide 33 is located on the inner side of the recessed portion 31 in the longitudinal direction L (i.e., on the side opposite the side on which the recessed portion 31 is open).

The first connector 100A includes two center shields 5, which are located in the midsection of the first insulating member 2 in the width direction W and extend in the longitudinal direction L. The center shields 5 each have a recessed portion 5*a*. Projections 9*a* of a center shield 9, which is included in the second connector 100B and will be described later, are caught in the respective recessed portions 5*a*. The center shields 5 may be connected to the ground established for the circuit board having the first connector 100A mounted thereon. The center shields 5 are intended for suppressing interference of electromagnetic waves between two rows of the first internal terminals 1.

Each of the recessed portions 31 is open on the side on which the corresponding one of the end surfaces of the first connector 100A is located; that is, the end surfaces of the first connector 100A each have an open structure. The term "open structure" as to the end surfaces means that the connector is not closed on the sides on which the end surfaces are located.

Second Connector 100B

The second connector 100B is illustrated in FIGS. 3A, 3B, and 4.

The second connector 100B includes second internal terminals 6. The second internal terminals 6 may be connected to signal lines on a circuit board having the second connector 100B mounted thereon or may be connected to the ground established for the circuit board. The second internal terminals 6 in the present embodiment are male terminals. Alternatively, the second internal terminals 6 may be female terminals.

The material of the second internal terminals 6 may be freely selected. For example, the second internal terminals 6 are made of phosphor bronze.

The second internal terminals 6 in the present embodiment are obtained by bending metal strips. Alternatively, the second internal terminals 6 may be stamped out of a springy metal member.

The second connector 100B includes a second insulating member 7. The second insulating member 7 is intended for holding the second internal terminals 6. The material of the second insulating member 7 may be freely selected. For example, the second insulating member 7 may be made of resin. The second internal terminals 6 are insert-molded with the second insulating member 7. Alternatively, the second internal terminals 6 may be pressed into the second insulating member 7 in a manner so as to be fastened in place.

The second internal terminals 6 are aligned in two rows extending in the longitudinal direction L. The second internal terminals 6 are extended from the second insulating member 7 in the width direction W.

The second connector 100B includes the second external terminals 8, each of which is located on the corresponding one of two ends of the second insulating member 7. The first connector 100A and the second connector 100B fit together in such a manner that the second external terminals 8 are caught in the respective recessed portions 31 of the first external terminals 3 of the first connector 100A.

The second external terminals 8 may be connected to the ground established for the circuit board having the second connector 100B mounted thereon. The second external terminals 8 shield the respective end surfaces of the second connector 100B.

The material of the second external terminals 8 may be freely selected. For example, the second external terminals 8 are made of phosphor bronze.

The second external terminals 8 each include second connection portions 82, which are located on the respective outer sides in the width direction W and are provided for connection to the corresponding first external terminal 3. A portion of each of the second external terminals 8 on the inner side in the longitudinal direction L may also be used as a second connection portion for connection to the corresponding first external terminal 3.

The second connection portions 82 in the present embodiment each have a rock hole 82*a*. The second connection portions 82 may each have a rock protrusion instead of the rock hole 82*a*. Although the second connection portions 82 each preferably have a rock protrusion or a rock hole to enhance the fit or to click to indicate a good fit, the second connection portions 82 may each have neither a rock protrusion nor a rock hole, and the second external terminals 8 may be pushed into the recessed portions in a manner so as to be fastened in place.

The second connector 100B includes the center shield 9, which is located in the midsection of the second insulating member 7 in the width direction W and extends in the longitudinal direction L. The center shield 9 has two projections 9*a*, which fit into the respective recessed portions 5*a* of the center shields 5 of the first connector 100A. The center shield 9 may be connected to the ground established for the circuit board having the second connector 100B mounted thereon. The center shield 9 is intended for suppressing interference of electromagnetic waves between two rows of the second internal terminals 6.

Multipolar Connector Set 100

Figure 7A:
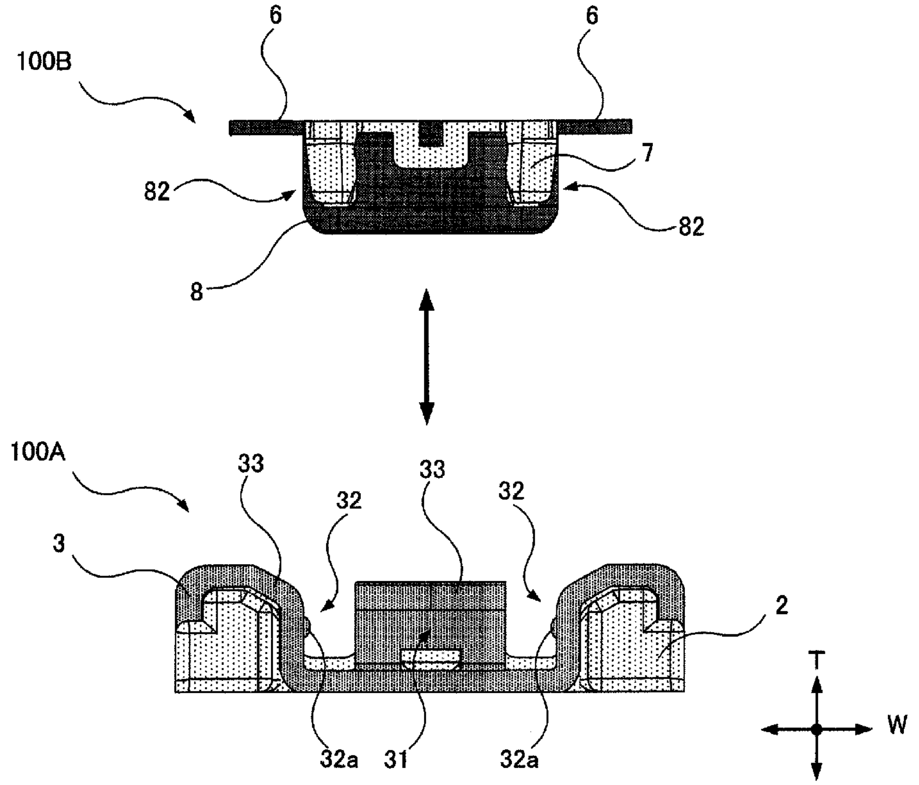
FIG. 7A is a front view of the multipolar connector set, illustrating a state in which the first connector and the second connector are delinked from each other.
Figure 7B:
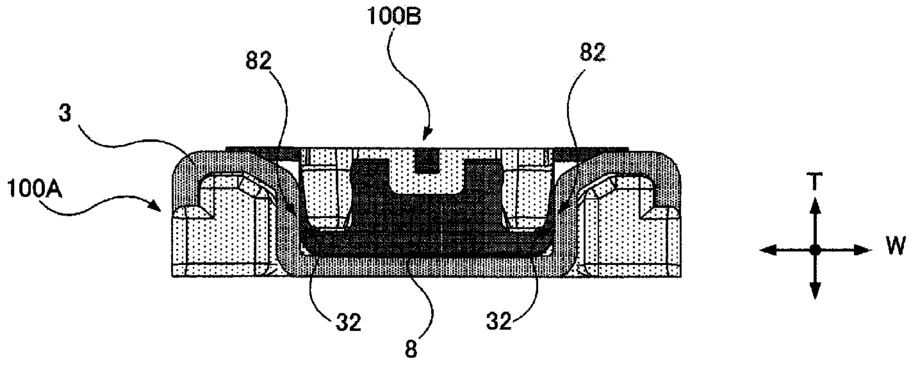
FIG. 7B is a front view of the multipolar connector set, illustrating a state in which the first connector and the second connector fit together.

The first connector 100A and the second connector 100B fit together to constitute the multipolar connector set 100. FIG. 5 is a perspective view of the multipolar connector set 100, illustrating a state in which the first connector 100A and the second connector 100B fit together. FIG. 6 is a perspective view of the multipolar connector set 100, illustrating a state in which the first connector 100A and the second connector 100B are delinked from each other. FIG. 7A is a front view of the multipolar connector set 100, illustrating a state in which the first connector 100A and the second connector 100B are delinked from each other. FIG. 7B is a front view of the multipolar connector set 100, illustrating a state in which the first connector 100A and the second connector 100B fit together.

In the state in which the first connector 100A and the second connector 100B fit together, the first internal terminals 1 are connected to the second internal terminals 6.

In the state in which the first connector 100A and the second connector 100B fit together, the second external terminals 8 are caught in the respective recessed portions 31, and the first connection portions 32 of each of the first external terminals 3 are connected to the respective second connection portions 82 of the corresponding one of the second external terminals 8. The first connection portions 32 are properly connected to the respective second connection portions 82 in such a manner that the rock protrusion 32*a* of each of the first connection portions 32 is caught in the rock hole 82*a* of the corresponding one of the second connection portions 82.

In the state in which the first connector 100A and the second connector 100B fit together, the projections 9*a* of the center shield 9 are caught in the respective recessed portions 5*a* of the center shields 5.

As can be seen from FIGS. 7A and 7B, each of the end surfaces of the first connector 100A of the multipolar connector set 100 has an open structure such that the state of connection between the first connection portions 32 and the second connection portions 82 is visible from the side on which the end surface of the first connector 100A is located. In other words, the open structure produces a significant improvement in the visibility of the connection state.

Each of the first external terminals 3 and the corresponding one of the second external terminals 8 are reliably connected to each other accordingly. The multipolar connector set 100 thus eliminates or reduces the possibility that electromagnetic fields radiated from the first internal terminals 1 and the second internal terminals 6 during transmission of radio-frequency signals will cause undesired resonance in the first external terminals 3, the second external terminals 8, the ground conductor pattern of the circuit board having the first connector 100A mounted thereon, and the ground conductor pattern of the circuit board having the second connector 100B mounted thereon.

Second Embodiment (Multipolar Connector Set 200)

Figure 8A:
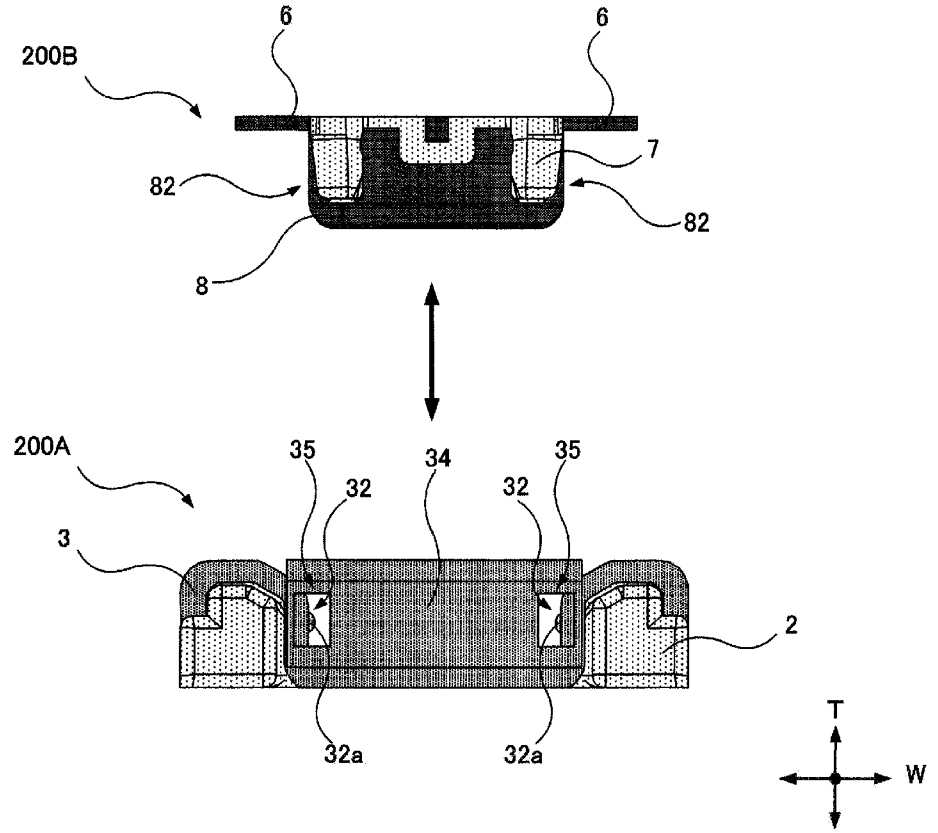
FIG. 8A is a front view of a multipolar connector set, illustrating a state in which a first connector and a second connector are delinked from each other.
Figure 8B:
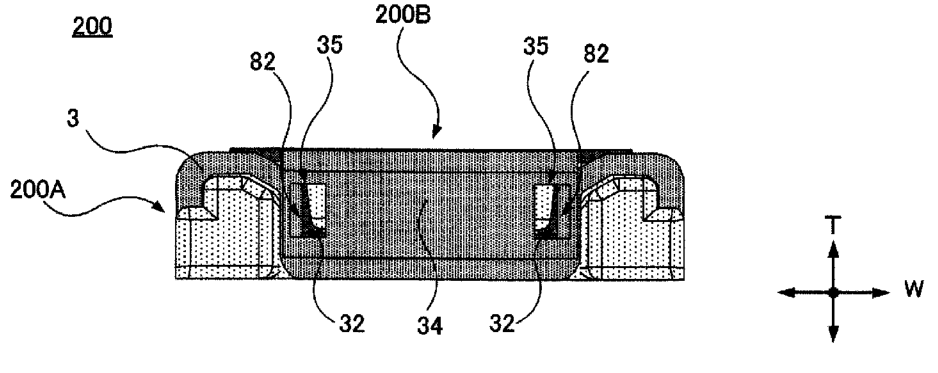
FIG. 8B is a front view of the multipolar connector set, illustrating a state in which the first connector and the second connector fit together.

FIGS. 8A and 8B illustrate a multipolar connector set 200 according to a second embodiment. The multipolar connector set 200 includes a first connector 200A and a second connector 200B, which fit together. FIG. 8A is a front view of the multipolar connector set 200, illustrating a state in which the first connector 200A and the second connector 200B are delinked from each other. FIG. 8B is a front view of the multipolar connector set 200, illustrating a state in which the first connector 200A and the second connector 200B fit together.

The multipolar connector set 200 according to the second embodiment involves some alterations to the structure of the multipolar connector set 100 according to the first embodiment. More specifically, the multipolar connector set 200 differs from the multipolar connector set 100 in the following respects. The end surfaces of the first connector 100A of the multipolar connector set 100 each have an open structure; that is, each of the recessed portions 31 is open on the side on which the corresponding one of the end surfaces of the first connector 100A is located. End surfaces of the first connector 200A of the multipolar connector set 200 each have a non-open structure; that is, each of the recessed portions 31 is closed with a wall surface 34 on the side on which the corresponding one of the end surfaces of the first connectors 200A is located. The wall surfaces 34 of the multipolar connector set 200 each have windows 35. Each of the recessed portions is closed with the wall surface 34 on the side on which the corresponding one of the end surfaces is located. This structure enables a further reduction in noise radiation from the multipolar connector set to the outside.

The windows 35 of each of the wall surfaces 34 permit viewing of the state of connection between the first connection portions 32 and the second connection portions 82; that is, the state of connection is visible from the side on which the corresponding one of the end surfaces of the first connector 200A is located. In this respect, the multipolar connector set 200 compares favorably with the embodiment above.

Third Embodiment (Multipolar Connector Set 300)

Figure 9A:
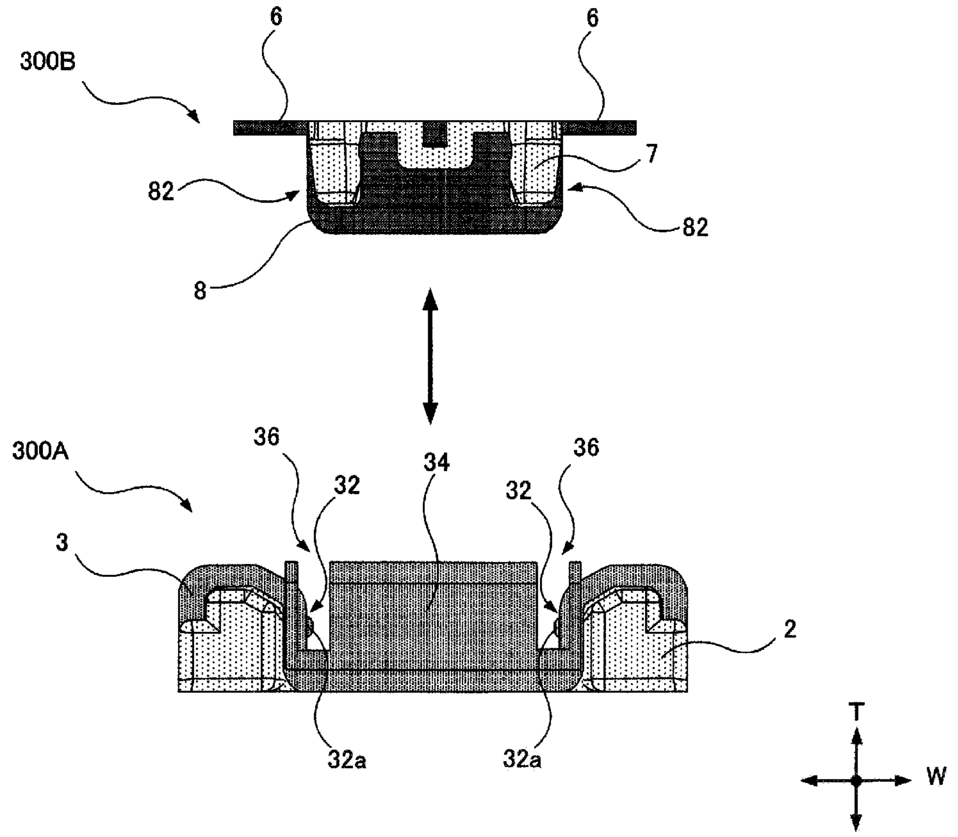
FIG. 9A is a front view of a multipolar connector set, illustrating a state in which a first connector and a second connector are delinked from each other.
Figure 9B:
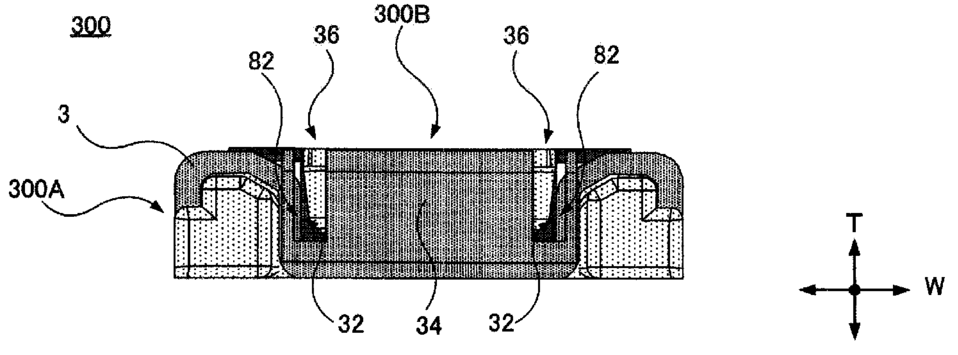
FIG. 9B is a front view of the multipolar connector set, illustrating a state in which the first connector and the second connector fit together.

FIGS. 9A and 9B illustrate a multipolar connector set 300 according to a third embodiment. The multipolar connector set 300 includes a first connector 300A and a second connector 300B, which fit together. FIG. 9A is a front view of the multipolar connector set 300, illustrating a state in which the first connector 300A and the second connector 300B are delinked from each other. FIG. 9B is a front view of the multipolar connector set 300, illustrating a state in which the first connector 300A and the second connector 300B fit together.

The multipolar connector set 300 according to the third embodiment involves some alterations to the structure of the multipolar connector set 100 according to the first embodiment. More specifically, the multipolar connector set 300 differs from the multipolar connector set 100 in the following respects. The end surfaces of the first connector 100A of the multipolar connector set 100 have an open structure; that is, each of the recessed portions 31 is open on the side on which the corresponding one of the end surfaces of the first connector 100A is located. End surfaces of the first connector 300A of the multipolar connector set 300 each have a non-open structure; that is, each of the recessed portions 31 is closed with a wall surface 34 on the side on which the corresponding one of the end surfaces of the first connectors 300A is located. The wall surfaces 34 of the multipolar connector set 300 each have slits 36.

The slits 36 of each of the wall surfaces 34 permit viewing of the state of connection between the first connection portions 32 and the second connection portions 82; that is, the state of connection is visible from the side on which the corresponding one of the end surfaces of the first connector 300A is located. In this respect, the multipolar connector set 300 compares favorably with the embodiments above. Each of the recessed portions is closed with the wall surface 34 on the side on which the corresponding one of the end surfaces is located. This structure enables a further reduction in noise radiation from the multipolar connector set to the outside.

The multipolar connector set 100 according to the first embodiment, the multipolar connector set 200 according to the second embodiment, and the multipolar connector set 300 according to the third embodiment have been described so far. It should be noted that the present disclosure is not limited to the embodiments above, and various alteration may be made in conformity with the spirit of the present disclosure.

The multipolar connector set according to an embodiment of the present disclosure is as described above.

At least one of the end surfaces of the first connector of the multipolar connector set preferably has an open structure such that the open structure enables viewing of the connection portions defined by the first and second external terminals from an end surface side of the first connector.

Alternatively, at least one of the end surfaces of the first connector preferably has a window such that the connection portions defined by the first and second external terminals are visible through the window from an end surface side of the first connector.

Still alternatively, at least one of the end surfaces of the first connector preferably has a slit such that the connection portions defined by the first and second external terminals are visible through the slit from an end surface side of the first connector.

The first external terminal preferably overlaps at least one of the end surfaces of the first connector. In this way, improved shielding may be provided.

The first external terminal is preferably provided to an end portion of the first connector. The second external terminal is preferably provided to an end portion of the second connector. The first external terminal preferably has a recessed portion. In the state in which the first connector and the second connector fit together, the second external terminal is preferably caught in the recessed portion, and at least one of the connection portions defined by the first and second external terminals includes a surface or a point of the recessed portion on an inner side in the width direction and a surface or a point of the second external terminal on an outer side in the width direction.

A multipolar connector set according to another aspect of the present disclosure includes a first connector and a second connector that fit together. A longitudinal direction, a width direction, and a height direction of each of the first connector, the second connector, and the multipolar connector set are orthogonal to one another in a state in which the first connector and the second connector fit together. The first connector, the second connector, and the multipolar connector set each have two end surfaces on opposite sides in the longitudinal direction, two side surfaces on opposite sides in the width direction, and two principal surfaces on opposite sides in the height direction. The first connector includes a first internal terminal, a first external terminal connected to a ground potential, and a first insulating member that holds the first internal terminal and the first external terminal. The second connector includes a second internal terminal, a second external terminal connected to the ground potential, and a second insulating member that holds the second internal terminal and the second external terminal. The first external terminal is provided to an end portion of the first connector. The second external terminal is provided to an end portion of the second connector. The first external terminal has a recessed portion. At least one of the end surfaces of the first connector has an open structure. In the state in which the first connector and the second connector fit together, the second external terminal is caught in the recessed portion, and connection portions defined by the first and second external terminals each include at least a surface or a point of the recessed portion on an inner side in the width direction and a surface or a point of the second external terminal on an outer side in the width direction. The open structure enables viewing of the connection portions from an end surface side of the first connector. As in the previous aspect, it is easy to check from the outside whether the first external terminal is properly connected to the second external terminal.

What is claimed is:

1. A multipolar connector set comprising a first connector and a second connector that are configured to fit together, wherein with a longitudinal direction, a width direction, and a height direction of each of the first connector, the second connector, and the multipolar connector set being orthogonal to one another in a state in which the first connector and the second connector fit together, the first connector and the second connector each have two end surfaces on opposite sides in the longitudinal direction, two side surfaces on opposite sides in the width direction, and two principal surfaces on opposite sides in the height direction, the first connector includes a first internal terminal, a first external terminal configured to connect to a ground potential, and a first insulating member that holds the first internal terminal and the first external terminal, the second connector includes a second internal terminal, at least one second external terminal configured to connect to the ground potential, and a second insulating member that holds the second internal terminal and the second external terminal, the first external terminal has a recessed portion configured to catch the second external terminal, and the recessed portion has an outer bottom surface exposed at an outer bottom surface of the first connector, and in the state in which the first connector and the second connector fit together, the first internal terminal is connected to the second internal terminal, and the first external terminal is connected to the second external terminal in such a manner that connection portions defined by the first and second external terminals are visible from an end surface side of the first connector.

2. The multipolar connector set according to claim 1, wherein at least one of the end surfaces of the first connector has an open structure, and the open structure enables viewing of the connection portions defined by the first and second external terminals from an end surface side of the first connector.

3. The multipolar connector set according to claim 1, wherein the first connector includes a pair of guides made of metal and configured to guide the at least one second external terminal in such a manner that the at least one second external terminal is positioned in the longitudinal direction with respect to the first external terminal when the first connector and the second connector fit together, the pair of guides is electrically connected to the first external terminal, the at least one second external terminal includes a pair of second external terminals, and in the state in which the first connector and the second connector fit together, one second external terminal of the pair of second external terminals, one guide of the pair of guides, an other guide of the pair of guides, and an other second external terminal of the pair of second terminals are arranged in a stated order in the longitudinal direction.

4. A multipolar connector set comprising a first connector and a second connector that are configured to fit together, wherein with a longitudinal direction, a width direction, and a height direction of each of the first connector, the second connector, and the multipolar connector set being orthogonal to one another in a state in which the first connector and the second connector fit together, the first connector and the second connector each have two end surfaces on opposite sides in the longitudinal direction, two side surfaces on opposite sides in the width direction, and two principal surfaces on opposite sides in the height direction, the first connector includes a first internal terminal, a first external terminal configured to connect to a ground potential, and a first insulating member that holds the first internal terminal and the first external terminal, the second connector includes a second internal terminal, a second external terminal configured to connect to the ground potential, and a second insulating member that holds the second internal terminal and the second external terminal, in the state in which the first connector and the second connector fit together, the first internal terminal is connected to the second internal terminal, and the first external terminal is connected to the second external terminal, at least one of the end surfaces of the first connector has a window, and connection portions defined by the first and second external terminals are visible through the window from an end surface side of the first connector.

5. A multipolar connector set comprising a first connector and a second connector that are configured to fit together, wherein with a longitudinal direction, a width direction, and a height direction of each of the first connector, the second connector, and the multipolar connector set being orthogonal to one another in a state in which the first connector and the second connector fit together, the first connector and the second connector each have two end surfaces on opposite sides in the longitudinal direction, two side surfaces on opposite sides in the width direction, and two principal surfaces on opposite sides in the height direction, the first connector includes a first internal terminal, a first external terminal configured to connect to a ground potential, and a first insulating member that holds the first internal terminal and the first external terminal, the second connector includes a second internal terminal, a second external terminal configured to connect to the ground potential, and a second insulating member that holds the second internal terminal and the second external terminal, in the state in which the first connector and the second connector fit together, the first internal terminal is connected to the second internal terminal, and the first external terminal is connected to the second external terminal, at least one of the end surfaces of the first connector has a slit, and connection portions defined by the first and second external terminals are visible through the slit from an end surface side of the first connector.

6. The multipolar connector set according to claim 4, wherein the first external terminal overlaps at least one of the end surfaces of the first connector.

7. The multipolar connector set according to claim 1, wherein the first external terminal is at an end portion of the first connector, the second external terminal is at an end portion of the second connector, in the state in which the first connector and the second connector fit together, the second external terminal is caught in the recessed portion, and at least one of the connection portions defined by the first and second external terminals includes a surface or a point of the recessed portion on an inner side in the width direction and a surface or a point of the second external terminal on an outer side in the width direction.

8. A multipolar connector set comprising a first connector and a second connector that are configured to fit together, wherein with a longitudinal direction, a width direction, and a height direction of each of the first connector, the second connector, and the multipolar connector set being orthogonal to one another in a state in which the first connector and the second connector fit together, the first connector and the second connector each have two end surfaces on opposite sides in the longitudinal direction, two side surfaces on opposite sides in the width direction, and two principal surfaces on opposite sides in the height direction, the first connector includes a first internal terminal, a first external terminal configured to connect to a ground potential, and a first insulating member that holds the first internal terminal and the first external terminal, the second connector includes a second internal terminal, a second external terminal configured to connect to the ground potential, and a second insulating member that holds the second internal terminal and the second external terminal, and the first external terminal is at an end portion of the first connector, the second external terminal is at an end portion of the second connector, the first external terminal has a recessed portion configured to catch the second external terminal, and the recessed portion has an outer bottom surface exposed at an outer bottom surface of the first connector, and at least one of the end surfaces of the first connector has an open structure, in the state in which the first connector and the second connector fit together, the second external terminal is caught in the recessed portion, and connection portions defined by the first and second external terminals each include at least a surface or a point of the recessed portion on an inner side in the width direction and a surface or a point of the second external terminal on an outer side in the width direction, and the open structure enables viewing of the connection portions from an end surface side of the first connector.

9. The multipolar connector set according to claim 2, wherein the first connector includes a pair of guides made of metal and configured to guide the at least one second external terminal in such a manner that the at least one second external terminal is positioned in the longitudinal direction with respect to the first external terminal when the first connector and the second connector fit together, the pair of guides is electrically connected to the first external terminal, the at least one second external terminal includes a pair of second external terminals, and in the state in which the first connector and the second connector fit together, one second external terminal of the pair of second external terminals, one guide of the pair of guides, an other guide of the pair of guides, and an other second external terminal of the pair of second terminals are arranged in a stated order in the longitudinal direction.

10. The multipolar connector set according to claim 5, wherein the first external terminal overlaps at least one of the end surfaces of the first connector.

11. The multipolar connector set according to claim 2, wherein the first external terminal is at an end portion of the first connector, the second external terminal is at an end portion of the second connector, in the state in which the first connector and the second connector fit together, the second external terminal is caught in the recessed portion, and at least one of the connection portions defined by the first and second external terminals includes a surface or a point of the recessed portion on an inner side in the width direction and a surface or a point of the second external terminal on an outer side in the width direction.

12. The multipolar connector set according to claim 4, wherein the first external terminal is at an end portion of the first connector, the second external terminal is at an end portion of the second connector, the first external terminal has a recessed portion, in the state in which the first connector and the second connector fit together, the second external terminal is caught in the recessed portion, and at least one of the connection portions defined by the first and second external terminals includes a surface or a point of the recessed portion on an inner side in the width direction and a surface or a point of the second external terminal on an outer side in the width direction.

13. The multipolar connector set according to claim 5, wherein the first external terminal is at an end portion of the first connector, the second external terminal is at an end portion of the second connector, the first external terminal has a recessed portion, in the state in which the first connector and the second connector fit together, the second external terminal is caught in the recessed portion, and at least one of the connection portions defined by the first and second external terminals includes a surface or a point of the recessed portion on an inner side in the width direction and a surface or a point of the second external terminal on an outer side in the width direction.

14. The multipolar connector set according to claim 6, wherein the first external terminal is at an end portion of the first connector, the second external terminal is at an end portion of the second connector, the first external terminal has a recessed portion, in the state in which the first connector and the second connector fit together, the second external terminal is caught in the recessed portion, and at least one of the connection portions defined by the first and second external terminals includes a surface or a point of the recessed portion on an inner side in the width direction and a surface or a point of the second external terminal on an outer side in the width direction.

15. The multipolar connector set according to claim 10, wherein the first external terminal is at an end portion of the first connector, the second external terminal is at an end portion of the second connector, the first external terminal has a recessed portion, in the state in which the first connector and the second connector fit together, the second external terminal is caught in the recessed portion, and at least one of the connection portions defined by the first and second external terminals includes a surface or a point of the recessed portion on an inner side in the width direction and a surface or a point of the second external terminal on an outer side in the width direction.

16. The multipolar connector set according to claim 1, wherein the connection portions defined by the first and second external terminals extend vertically in the height direction of the first and second connectors and the vertically extending connection portions are visible from an end surface side of the first connector.

17. The multipolar connector set according to claim 4, wherein the connection portions defined by the first and second external terminals extend vertically in the height direction of the first and second connectors and the vertically extending connection portions are visible through the window from an end surface side of the first connector.

18. The multipolar connector set according to claim 5, wherein the connection portions defined by the first and second external terminals extend vertically in the height direction of the first and second connectors and the vertically extending connection portions are visible through the slit from an end surface side of the first connector.

19. The multipolar connector set according to claim 8, wherein the connection portions extend vertically in the height direction of the first and second connectors and the open structure enables viewing of the vertically extending connection portions from an end surface side of the first connector.

* * * * *